United States Patent [19]
Richmond et al.

[11] Patent Number: 5,813,652
[45] Date of Patent: Sep. 29, 1998

[54] APPARATUS FOR SUPPRESSING NOISE GENERATED BY A FLOW OF WATER THROUGH A WATER VALVE

[75] Inventors: James William Richmond, Hamilton County; Michael R. DuHack, Marion County, both of Ind.

[73] Assignee: Emerson Electric Co., St. Louis, Mo.

[21] Appl. No.: 735,357

[22] Filed: Oct. 22, 1996

[51] Int. Cl.⁶ .............................. F16K 47/14; F16K 31/40
[52] U.S. Cl. ........................ 251/127; 251/30.03; 138/42; 138/45
[58] Field of Search ................... 251/120, 118, 251/127, 30.03; 138/40, 42, 45, 44

[56] References Cited

U.S. PATENT DOCUMENTS

| | | |
|---|---|---|
| 3,396,848 | 8/1968 | Kozel . |
| 3,431,944 | 3/1969 | Sakuma . |
| 4,248,270 | 2/1981 | Ostrowski . |
| 4,938,259 | 7/1990 | Schmidt .................................. 138/45 |
| 5,082,240 | 1/1992 | Richmond . |
| 5,154,394 | 10/1992 | DuHack .............................. 138/45 X |
| 5,209,265 | 5/1993 | Taguri et al. . |
| 5,269,333 | 12/1993 | Richmond . |
| 5,315,859 | 5/1994 | Schommer ............................. 138/44 X |
| 5,340,080 | 8/1994 | Cleland ................................. 138/45 X |
| 5,487,528 | 1/1996 | Richmond ............................... 251/127 |

*Primary Examiner*—Kevin Lee
*Attorney, Agent, or Firm*—Mark D. Becker

[57] ABSTRACT

A noise suppression assembly including a retainer having (1) a retainer body defining a central cavity therein, (2) a base flange extending outwardly from the retainer body, and (3) a fluid channel defined therein. The noise suppression assembly further includes a flow control member having a central passage through which the flow of water advances, the central passage of the flow control member being offset from the fluid channel of the retainer. Moreover, the noise suppression assembly also includes a suppresser having (1) a suppresser body, (2) a bullet secured to the suppresser body, and (3) a hole defined therein through which the flow of water advances, the hole of the suppresser being offset from the central passage of the flow control member, and further the bullet being aligned with the central passage of the flow control member. The base flange of the retainer has a peripheral edge with the fluid channel being spaced apart therefrom. Moreover, the retainer is configured so as to create a reverse flow of water which opposes the flow of water entering the fluid channel thereby reducing the velocity of the flow of water advancing therethrough.

24 Claims, 11 Drawing Sheets

APPARATUS FOR SUPPRESSING NOISE GENERATED BY A FLOW OF WATER THROUGH A WATER VALVE

BACKGROUND OF THE INVENTION

The present invention relates generally to water valves, and more specifically to an apparatus for suppressing noise generated by a flow of water through a water valve.

Electrically operated water valves are commonly used in many household appliances such as dishwashers, clothes washers, and refrigerator icemakers. Such appliance water valves are generally controlled by a controller included in the appliance, thereby providing a flow of water, at a predetermined flow rate, for use by the appliance.

Due to its use in households, it is desirable for an appliance water valve to operate quietly. For example, some appliance water valves, such as those in dishwashers and icemakers, commonly operate during the night when members of the household are sleeping. As a result, it is undesirable for the appliance water valve to generate an excessive amount of noise.

One of the major sources of noise in the operation of an appliance water valve is "cavitation". Cavitation is the sudden formation and collapse of low-pressure bubbles in a liquid, such as water, as the liquid flows from an area of higher pressure, such as the inlet of an appliance water valve, to an area of lower pressure, such as the outlet of an appliance water valve. As the low-pressure bubbles collapse, energy is released which causes structural vibrations within the appliance water valve. Such structural vibrations generally result in the production of noise.

In addition to noise, the structural vibrations due to cavitation may also cause damage to the appliance water valve. In particular, the components within the appliance water valve may be eroded, fatigued, or pitted due to cavitation. Hence, the operative life of the appliance water valve may be reduced by cavitation.

Moreover, many appliance water valves are coupled to a hot water source in order to control the flow of hot water into an appliance. Gases, such as air, are less soluble in hot water than in cold water, thereby resulting in more gaseous bubbles being generated as the water is increased in temperature. Hence, cavitation is typically exacerbated when an appliance water valve is coupled to a hot water source.

Cavitation, and the noise generated therefrom, may be lessened by reducing the velocity of the water flowing through the valve. One way to reduce the velocity of the water flowing through the valve is to create backpressure within the valve.

Backpressure may be created by directing the water flow against a surface of a solid object which causes a change in the direction of the water flow. The change of direction, along with the viscous friction created on the surface of the solid object, causes the velocity of the water to be reduced.

However, if excessive backpressure is created, the water flow rate may be reduced in addition to the flow velocity. In such a case, an adequate amount of water may not pass through the appliance water valve for use by the appliance.

What is needed therefore, is an appliance water valve which creates a sufficient amount of backpressure, thereby reducing cavitation and the noise generated therefrom, but does not impede the flow rate of the water flowing therein.

SUMMARY OF THE INVENTION

In accordance with a first embodiment of the present invention, there is provided a noise suppression assembly including a retainer having (1) a retainer body defining a central cavity therein, (2) a base flange extending outwardly from the retainer body, and (3) a fluid channel defined therein. The noise suppression assembly further includes a flow control member having a central passage through which the flow of water advances, the central passage of the flow control member being offset from the fluid channel of the retainer. Moreover, the noise suppression assembly also includes a suppresser having (1) a suppresser body, (2) a bullet secured to the suppresser body, and (3) a hole defined therein through which the flow of water advances, the hole of the suppresser being offset from the central passage of the flow control member, and further the bullet being aligned with the central passage of the flow control member.

In accordance with another embodiment of the present invention there is provided a water valve assembly including a valve body having an interior sidewall and a retainer which has (1) a base flange having a peripheral edge which contacts the interior sidewall of the valve body, and (2) a fluid channel through which a flow of water advances, the fluid channel being spaced apart from the peripheral edge. The water valve further includes a flow control member having a central passage through which the flow of water advances, the central passage of the flow control member being offset from the fluid channel of the retainer. The water valve assembly also includes a suppresser having a hole defined therein through which the flow of water advances, the hole of the suppresser being offset from the central passage of the flow control member.

In accordance with yet another embodiment of the present invention there is provided a noise suppression assembly for a water valve which includes a retainer having a fluid channel through which a flow of water (F) advances, the retainer being configured to create a reverse flow of water (RF) which opposes the flow of water (F) prior to the flow of water (F) entering the fluid channel thereby reducing the velocity of the flow of water (F). The assembly further includes a flow control member having a central passage through which the flow of water (F) advances, the central passage of the flow control member being offset from the fluid channel of the retainer. In addition, the assembly includes a suppresser having a hole defined therein through which the flow of water (F) advances, the hole of the suppresser being offset from the central passage of the flow control member.

In accordance with a further embodiment of the present invention there is provided a water valve assembly having an inlet and an outlet, with the water valve assembly selectively enabling a flow of water (F) to advance from the inlet to the outlet. The water valve assembly includes a noise suppression assembly positioned in the flow of water (F). The water valve assembly further includes a valve mechanism positioned in the flow of water (F), the valve mechanism (1) allows the flow of water (F) to pass from the inlet to the outlet in a first mode of operation, and (2) prevents the flow of water (F) from passing from the inlet to the outlet in a second mode of operation. The noise suppression assembly includes (1) a retainer having a fluid channel through which a flow of water (F) advances, the retainer being configured to create a reverse flow of water (RF) which opposes the flow of water (F) prior to the flow of water (F) entering the fluid channel thereby reducing the velocity of the flow of water (F), (2) a flow control member having a central passage through which the flow of water (F) advances, the central passage of the flow control member being offset from the fluid channel of the retainer, and (3) a suppresser having a hole defined therein through which the flow of water (F)

advances, the hole of the suppresser being offset from the central passage of the flow control member.

It is therefore an object of the present invention to provide a new and useful noise suppression assembly.

It is another object of the present invention to provide an improved noise suppression assembly.

It is a further object of the present invention to provide a new and useful water valve assembly.

It is yet another object of the present invention to provide an improved water valve assembly.

It is moreover an object of the present invention to provide a new and useful apparatus for suppressing the noise generated by a flow of water through a water valve.

It is yet another object of the present invention to provide an improved apparatus for suppressing the noise generated by a flow of water through a water valve.

It is further an object of the present invention to provide a water valve assembly which is relatively quiet.

It is moreover an object of the present invention to provide a water valve assembly which reduces cavitation.

It is yet another object of the present invention to provide a water valve assembly which is relatively quiet and has a relatively good flow rate.

It is a further object of the present invention to provide a water valve assembly which reduces cavitation and has a relatively good flow rate.

The above and other objects, features, and advantages of the present invention will become apparent from the following description and the attached drawings.

DETAILED DESCRIPTION OF THE INVENTION

While the invention is susceptible to various modifications and alternative forms, specific embodiments thereof have been shown by way of example in the drawings and will herein be described in detail. It should be understood, however, that there is no intent to limit the invention to the particular forms disclosed, but on the contrary, the intention is to cover all modifications, equivalents, and alternatives falling within the spirit and scope of the invention as defined by the appended claims.

Figure 1:
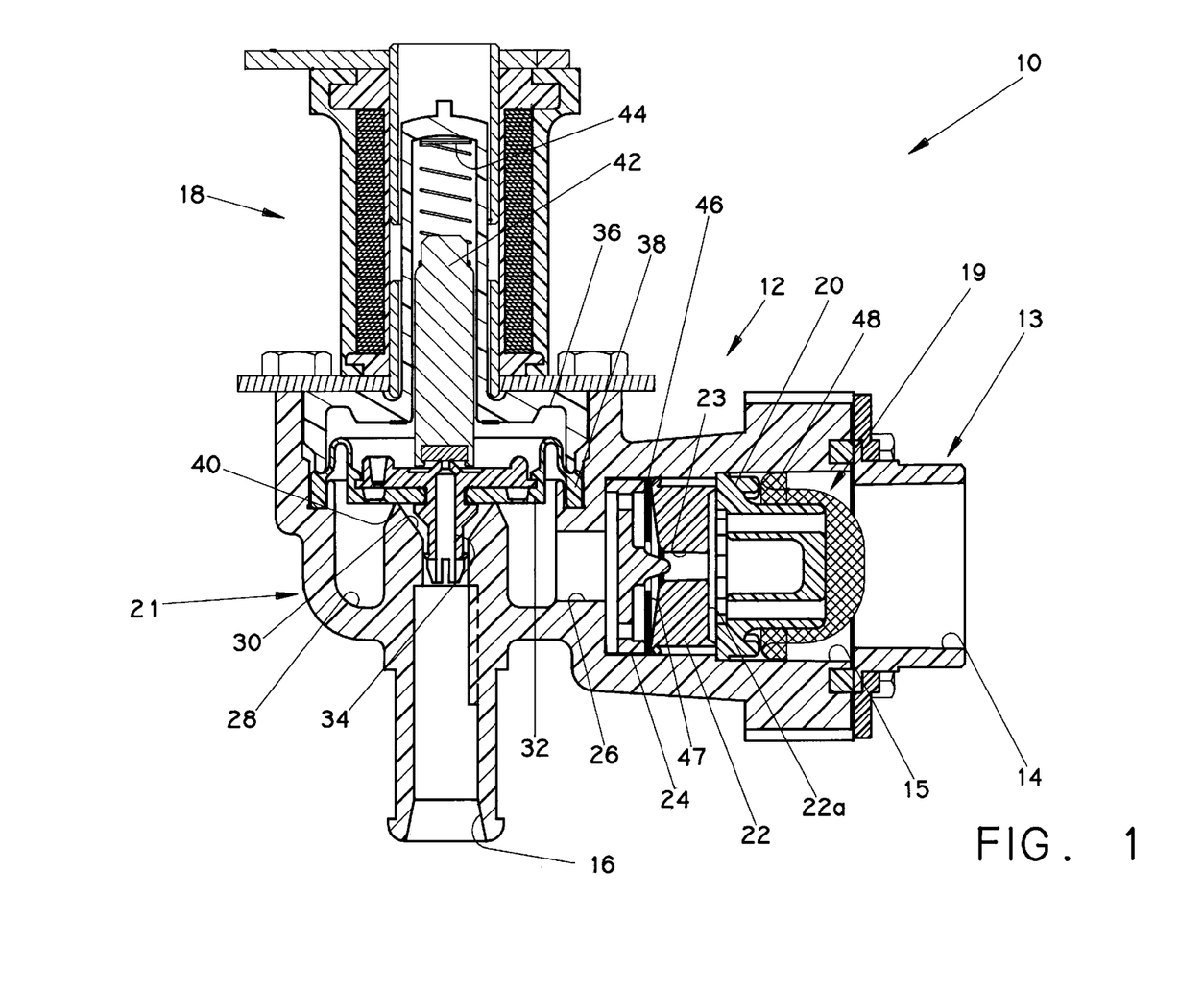
FIG. 1 is a cross sectional view of an appliance water valve which incorporates the features of the present invention therein.

Referring now to FIG. 1, there is shown a cross sectional view of an appliance water valve 10. The appliance water valve 10 includes a valve body 12 having an outlet 16 defined therein. Attached to the valve body 12 is an inlet member 13 having an opening 14 defined therein. The appliance water valve 10 further includes a valve actuator 18 and a noise suppression assembly 19.

The inlet member 13 is typically connected to a residential water line (not shown), thereby providing for a water flow to the inlet opening 14. The outlet 16 is typically a tube-type connector which is connected to a fill line of an appliance (not shown), such as a dishwasher, clothes washer, or an icemaker.

The valve body 12 further includes a fluid passage 26, a main chamber 28, and an outlet orifice 30 defined therein. The fluid passage 26, a chamber 15, the main chamber 28, and the outlet orifice 30 are disposed between, and in fluid communication with, the inlet opening 14 and the outlet 16. When the valve actuator 18 is in an open position, a flow of water is advanced into the valve body 12 through the inlet opening 14. Thereafter, the flow of water advances through the chamber 15, the fluid passage 26, the main chamber 28, the outlet orifice 30, and then exits out the valve body 12 through the outlet 16.

The valve actuator 18 includes a diaphragm 32, a diaphragm insert 34, a guide tube 36, and an armature 42. The valve actuator 18 is sealingly engaged to the valve body 12 at a retention groove 38. The armature 42 is disposed in the guide tube 36, and is biased against the diaphragm insert 34 by a spring 44, thereby urging the diaphragm insert 34 and the diaphragm 32 against a valving surface 40. The diaphragm 32 is made of a flexible material, such as ethylene propylene (EP) rubber, thereby providing desirable sealing characteristics when biased against the valving surface 40.

When the valve actuator 18 is in a closed position, such as shown in FIG. 1, the diaphragm is biased against the valving surface 40, thereby preventing water from flowing out of the main chamber 28 through the outlet orifice 30. However, when the valve actuator 18 is moved to an open position, i.e. a position wherein the diaphragm 32 is spaced apart from the valving surface 40, water is permitted to flow out of the main chamber 28 through the outlet orifice 30, thereby providing for a flow of water out of the outlet 16 and into the fill line of the appliance (not shown). Hence, the valve actuator 18 and the valve body 12 (including the valving surface 40), collectively referred to as a valve mechanism 21, cooperate to selectively control the advancement of water from the inlet opening 14 to the outlet 16.

Figure 2:
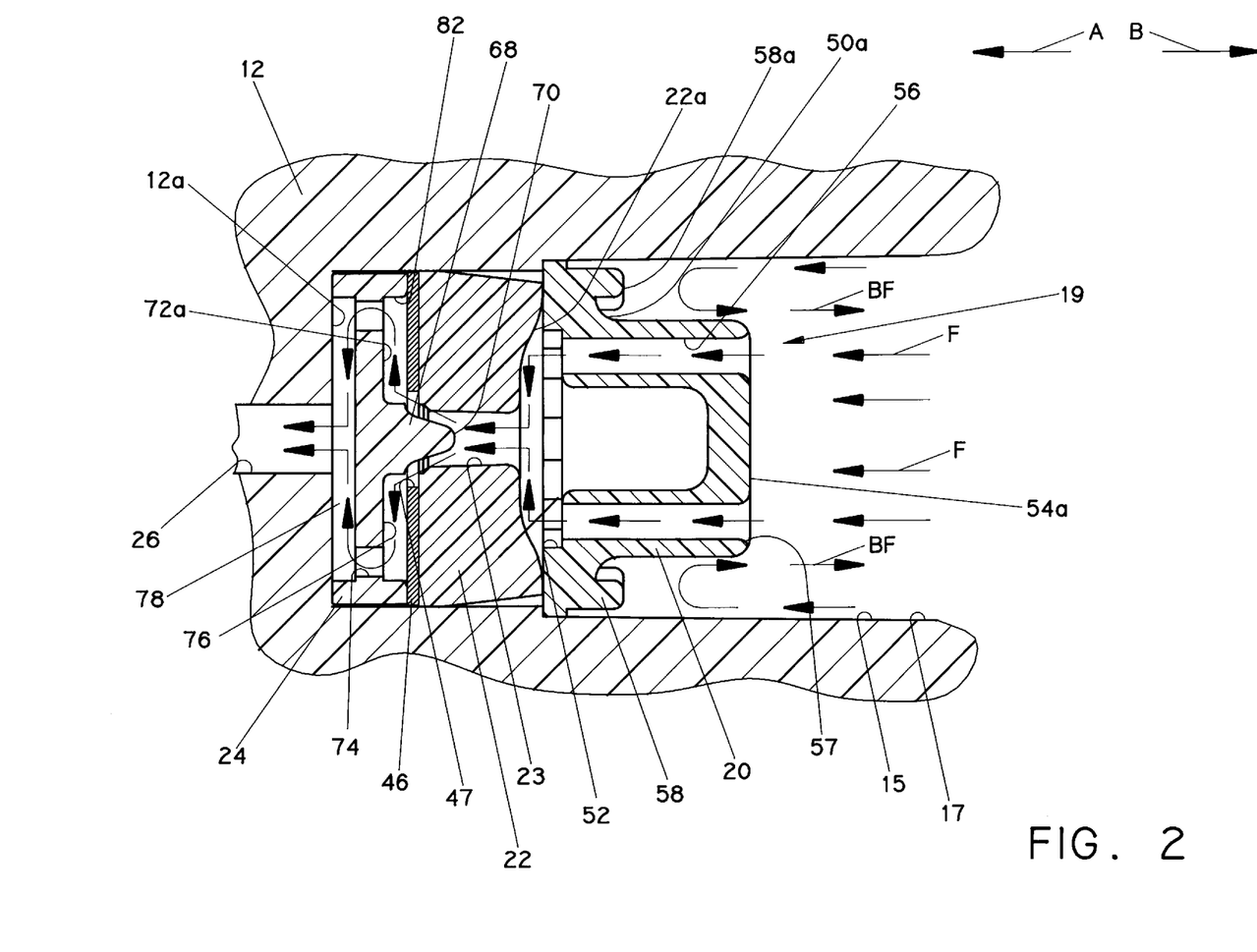
FIG. 2 is an enlarged cross sectional view of a noise suppression assembly of the appliance water valve of FIG. 1.

Referring now to FIG. 2, the noise suppression assembly 19 is disposed in the chamber 15 of the valve body 12 between the fluid passage 26 and the inlet opening 14 (see FIG. 1). The noise suppression assembly includes a suppresser 24, an inlet washer 46, a flow control member 22, a retainer 20, and a screen 48 (not shown in FIG. 2, but see FIG. 1). The screen 48 inhibits debris particles, which may be contained in the incoming residential water flow, from reaching the retainer 20, the flow control member 22, the suppresser 24, or other components within the appliance water valve 10.

The flow control member 22 is made of flexible material such as ethylene propylene (EP) rubber, and has a central passage 23 defined therein. The flow control member 22 flexes or deforms in response to variations in inlet water pressure exerted on an upstream surface 22a thereof. In particular, a higher inlet water pressure on the upstream surface 22a causes a greater amount of flexing or deformity of the flow control member 22, thereby reducing the diameter of the central passage 23. A lower inlet water pressure exerted on the upstream surface 22a, causes the flexing or deformity of the flow control to be reduced, thereby increasing the diameter of the central passage 23.

The inlet washer 46 has a washer orifice 47 defined therein, and provides a surface on which the flow control member 22 is supported. The inlet washer is typically made of a metallic material, such as stainless steel.

Figure 3:
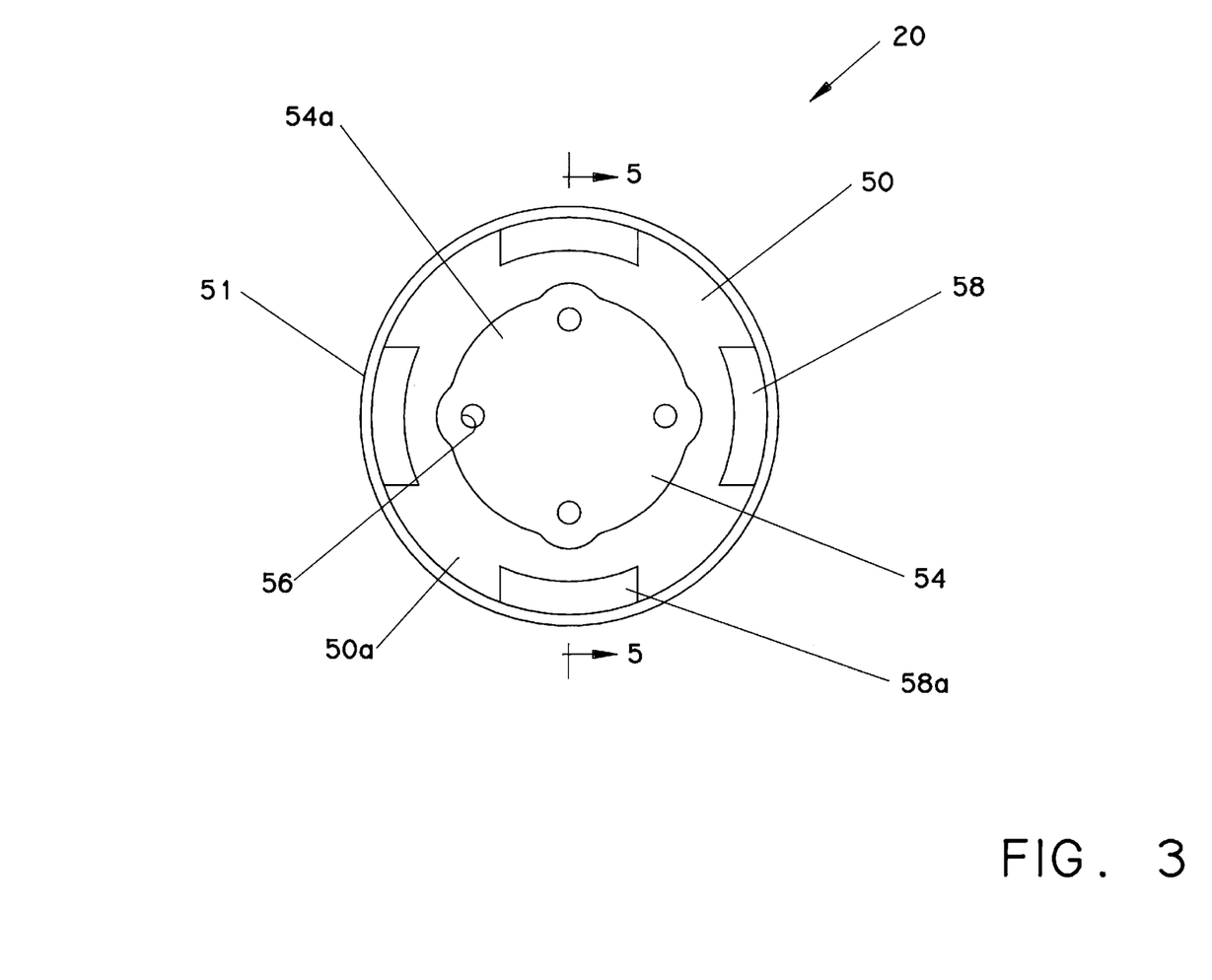
FIG. 3 is a top elevational view of a retainer of the noise suppression assembly of FIG. 2.
Figure 4:
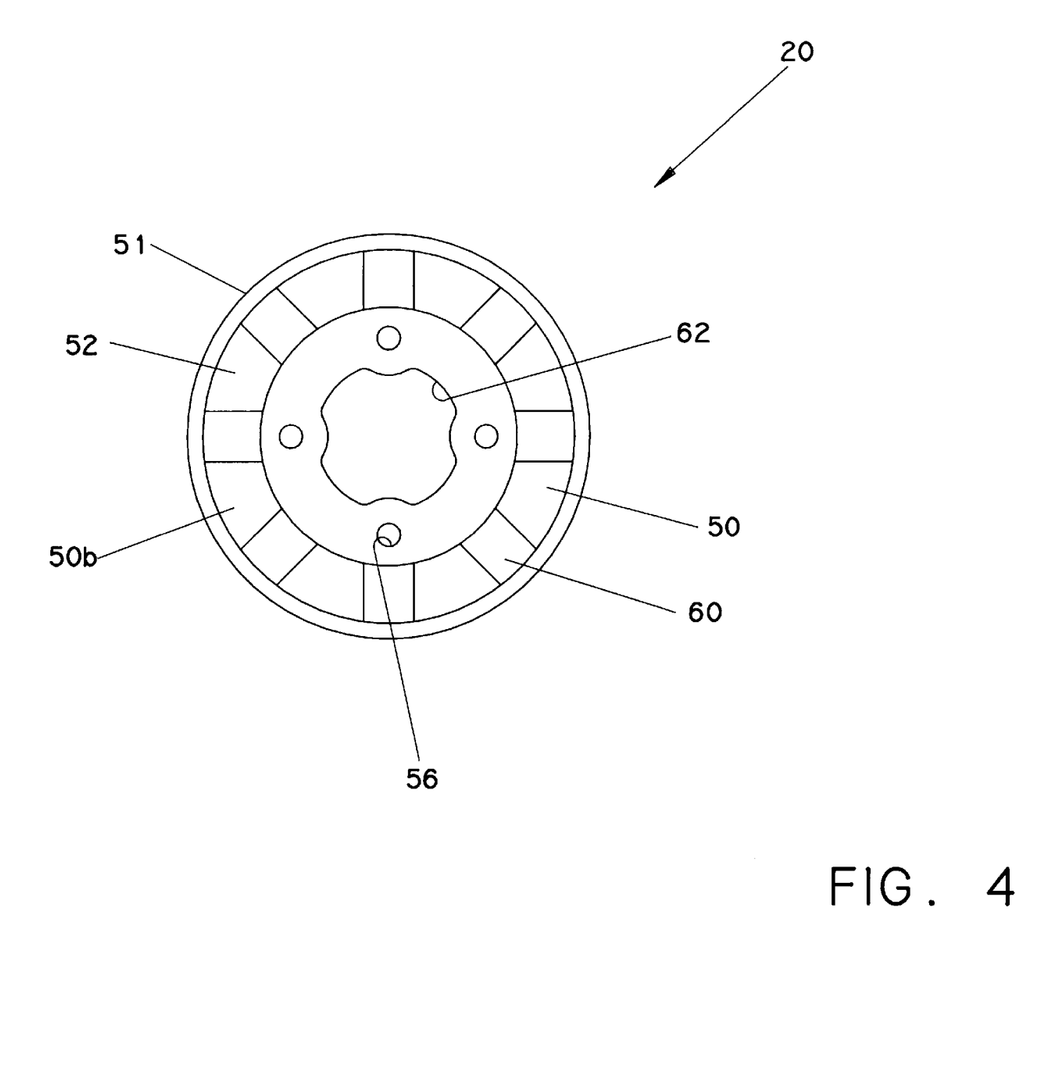
FIG. 4 is a bottom elevational view of the retainer of FIG. 3.
Figure 5:
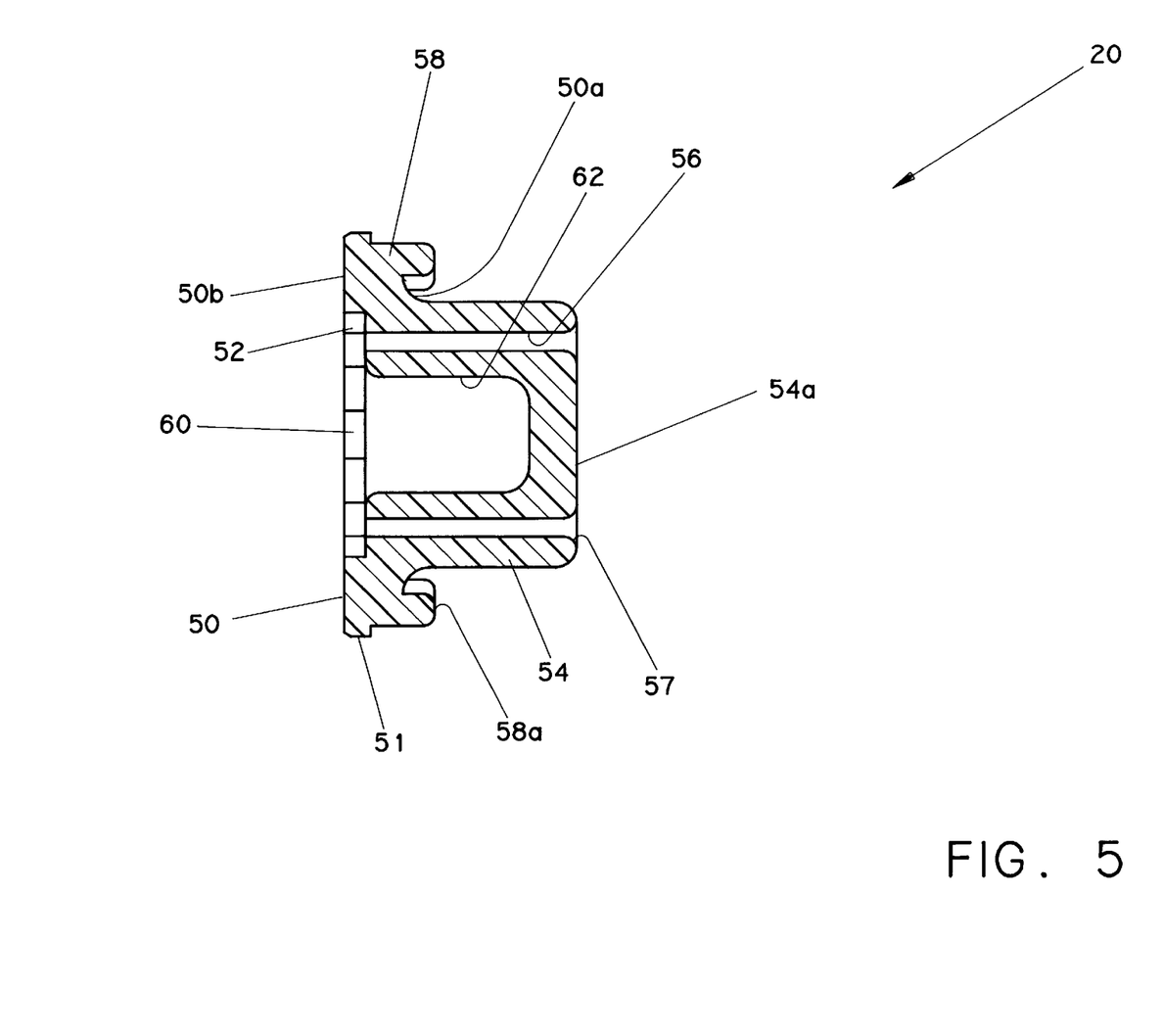
FIG. 5 is a cross sectional view taken along the line 5—5 of FIG. 3 as viewed in the direction of the arrows.

FIGS. 3–5 show the retainer 20 in more detail. It should be noted that in addition to holding the flow control member 22 in place, the retainer 20 of the present invention also causes a flow pressure drop which reduces the velocity of the water flowing through the flow control member 22.

The retainer 20 is typically made of a plastic material, such as polypropylene. The retainer 20 includes a base flange 50 and a body 54. The base flange 50 includes an upstream surface 50a and a downstream surface 50b, while the body 54 includes an upstream surface 54a.

The base flange 50 includes a peripheral edge 51 which contacts a sidewall 17 of the chamber 15. The peripheral edge 51 of the base flange 50 extends 360° therearound. Disposed on the upstream surface 50a of the base flange 50 is a number of support members 58 which are provided to mechanically support the screen 48 (see FIG. 1). In particular, the screen 48 is positioned to contact an upstream surface 58a of the support member 58 during operation of the appliance water valve 10.

The downstream surface 50b of the base flange 50 includes a number of standoff members 60 disposed in a fluid chamber 52 which are positioned to retain the flow control member 22 during the operation of the appliance water valve 10. The fluid chamber 52 cooperates with the flow control member 22 to reduce the velocity of the flow of water advancing through the retainer 20 and into the central passage 23 of the flow control member 22.

The body 54 of the retainer 20 includes a central cavity 62 defined therein which may hold a volume of water in order to provide enhanced noise suppression characteristics. In particular, the volume of water contained within the central cavity 62 absorbs a portion of the energy inherent in the flow of water advancing through the fluid channels 56.

The body 54 of the retainer 20 further includes a plurality of fluid channels 56 defined therein. Each of the fluid channels 56 possesses a diameter having a value in the range of approximately 0.060 inch to approximately 0.090 inch. Preferably, the diameter of the fluid channels 56 is approximately 0.075 inch. Each of the fluid channels 56 includes a channel inlet 57. The fluid channels 56 extend through the entire length of the body 54 and are in fluid communication with the fluid chamber 52. Hence, water flowing from the inlet opening 14 is advanced through the channel inlets 57, the fluid channels 56 and into the fluid chamber 52. The configuration of the retainer 20 functions to reduce the velocity of the flow of water advancing through the central passage 23 of the flow control 22, which in turn reduces cavitation in the appliance water valve 10 and thereby reduces the amount of noise created by the appliance water valve 10.

Moreover, the fluid channels 56 are offset from the central passage 23 of the flow control member 22. What is meant herein by the term "offset" is that a direct flow path or line of advancement of the flow of water does not exist between the fluid channels 56 and the central passage 23. For example, the fluid channels 56 are offset from the central passage 23 since as the flow of water exits the fluid channels 56, the flow of water must first strike or impinge upon the upstream surface 22a of the flow control member 22 before being directed into the central passage 23, and therefore does not have a direct flow path or line of advancement of the flow of water to the central passage 23.

Figure 6:
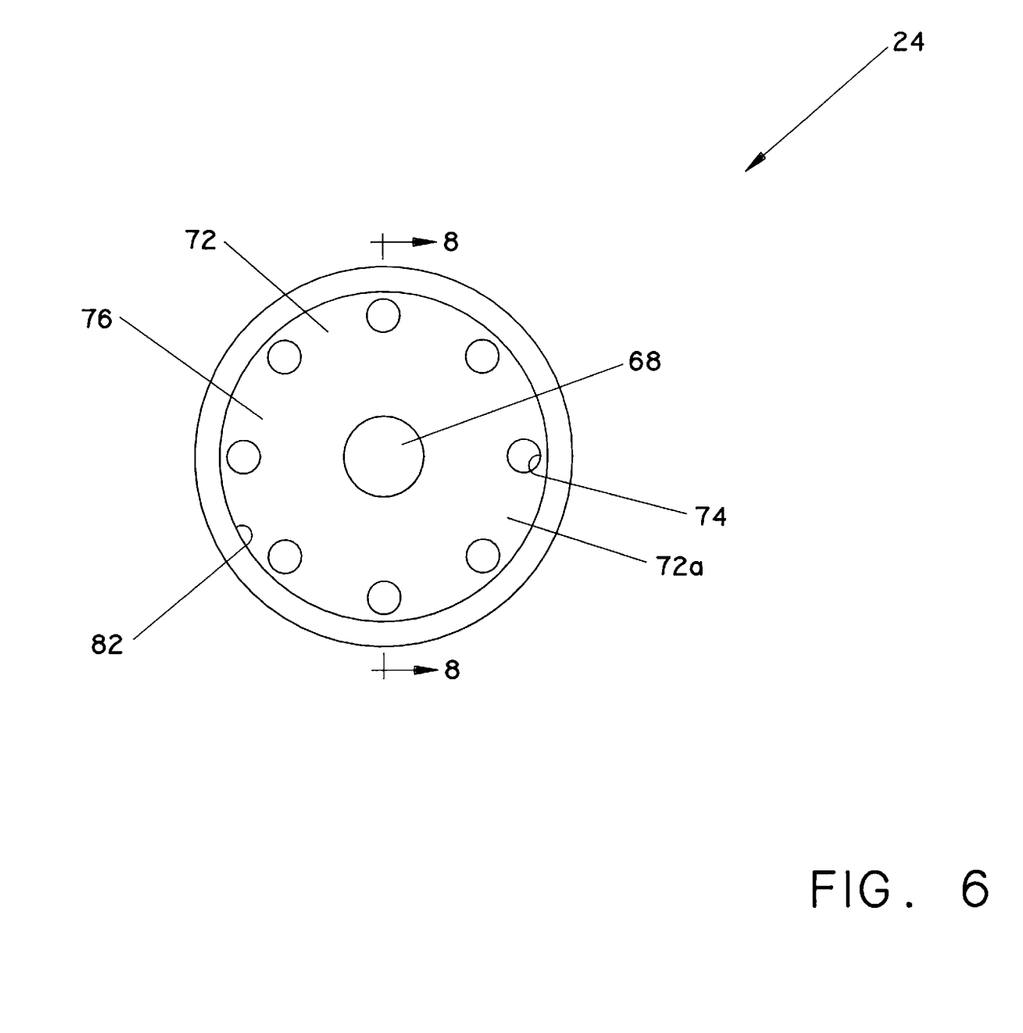
FIG. 6 is a top elevational view of a suppresser of the noise suppression assembly of FIG. 2.
Figure 7:
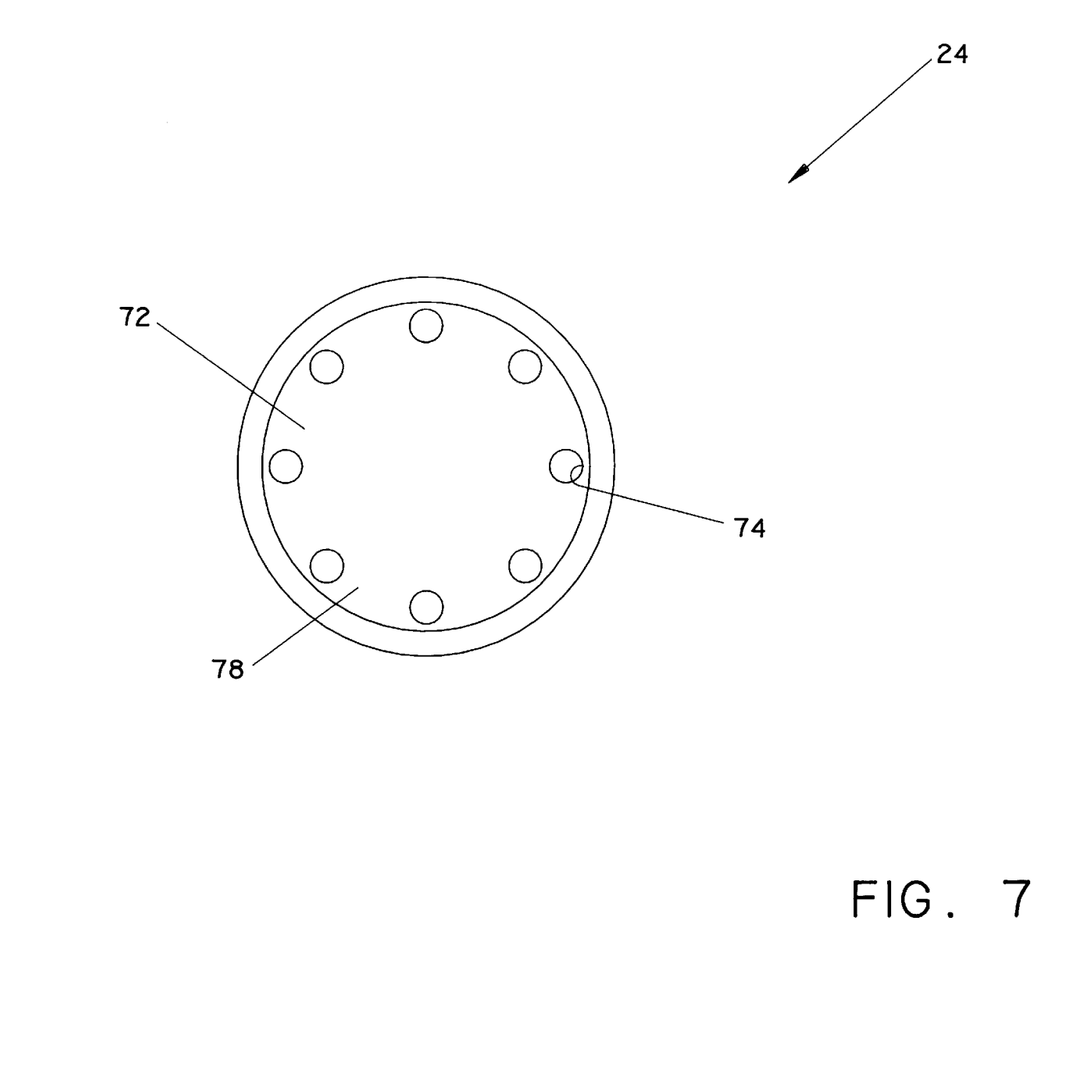
FIG. 7 is a bottom elevational view of the suppresser of FIG. 2.
Figure 8:
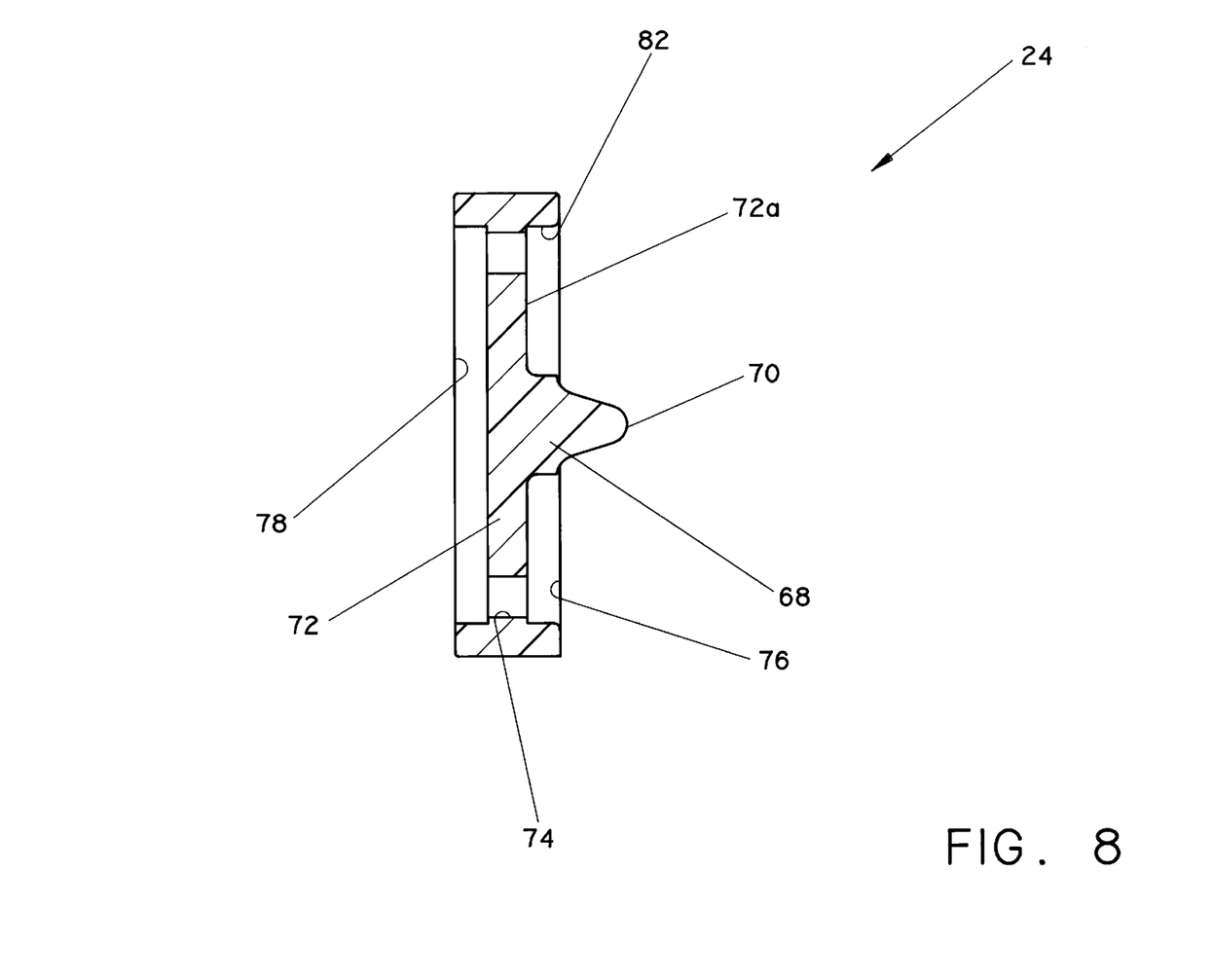
FIG. 8 is a cross sectional view taken along the line 8—8 of FIG. 6 as viewed in the direction of the arrows.

FIGS. 6–8 show the suppresser 24 in more detail. The suppresser 24 is similar to the suppresser disclosed in U.S. Pat. No. 5,487,528 issued to Richmond, the disclosure of which is herein incorporated by reference. The suppresser 24 reduces the amount of cavitation, and hence the amount of noise, generated by the flow of water being advanced through the appliance valve 10.

The suppresser 24 is made from a plastic material, such as polypropylene. The suppresser 24 includes a bullet 68 and a body 72. The bullet 68 includes a tip 70. The bullet 68 protrudes through the washer orifice 47 of the inlet washer 46 and a portion of the central passage 23 of the flow control member 22, thereby centrally aligning the tip 70 in the central passage 23, as shown in FIG. 2. Since the bullet 68 is aligned with the central passage 23, a direct flow path or line of advancement of the flow of water exists.

The suppresser 24 is configured to define a dispersion chamber 76 and a recombining chamber 78. The dispersion chamber 76 includes an upstream surface 72a and a peripheral wall 82, as shown in FIGS. 6 and 8. The tip 70 of the bullet 68 disperses and directs the flow of water which is advancing through the flow control member 22 into the dispersion chamber 76.

From the dispersion chamber 76, the flow of water is directed through a number of holes 74 defined in the body 72, and into the recombining chamber 78. The holes 74 are offset from the fluid passage 26, as shown in FIG. 2. The recombining chamber 78 is provided to accumulate the water flowing through the holes 74 and directs the flow of water into the fluid passage 26. It should be noted that the holes 74 are also offset from the central passage 23 of the flow control member 22.

Referring again to FIG. 2, the noise suppression assembly 19 is shown in more detail. (Note that the screen 48 has been removed for clarity of description.) In particular, the noise suppression assembly 19 is shown positioned within a flow of water F within the valve body 12.

The flow of water, indicated by arrows F, flows from the inlet opening 14 (see FIG. 1) in the general direction of arrow A. The flow of water strikes the retainer 20 in a number of locations. In particular, a portion of the flow of water strikes the upstream surface 58a of the support members 58, the upstream surface 50a of the base flange 50, and the upstream surface 54a of the body 54. The portion of the flow of water which strikes the upstream surfaces 50a, 54a, 58a is required to make a number of direction changes which result in a reverse flow of water, indicated by arrows RF, in the general direction of arrow B. In particular, the portion of the flow of water which strikes the upstream surfaces 50a, 54a, 58a is directed in the general direction of arrow B so as to impinge upon water flowing from the inlet opening 14 in the general direction of arrow A. As the two flows collide, backpressure is created which reduces the velocity of the flow of water flowing in the general direction of arrow A. As a result, cavitation, and hence the noise generated as a result thereof, is reduced.

A portion of the flow of water, either flowing directly from the inlet opening 14 or redirected after striking the upstream surfaces 50a, 54a, 58a, enters the fluid channels 56, thereby providing a flow of water to the flow control member 22. It should be appreciated that the number and length of the fluid channels 56 may vary depending on the magnitude of backpressure desired for a given appliance water valve 10.

When the flow of water exits the fluid channels 56 and the fluid area 52, it impinges upon the upstream surface 22a of the flow control member 22, and is redirected towards the central passage 23. As the water flows toward the central passage 23, it collides with water being directed towards the central passage 23 from the other fluid channels 56. Hence, the colliding flows of water create additional backpressure, which in turn reduces the velocity of the water advancing through the central passage 23.

The flow of water advancing through the central passage 23 contacts the tip 70 of the bullet 68. The bullet 68 disperses and directs the flow of water through the washer orifice 47 and into the dispersion chamber 76. Thereafter, the flow of water strikes the upstream surface 72a causing it to flow radially outward until it strikes the peripheral wall 82. When the flow of water strikes the upstream surface 72a and the peripheral wall 82, it is redirected thus resulting in additional backpressure, which further reduces the velocity of the flow of water entering the holes 74.

As the flow of water exits the holes 74 into the recombining chamber 78, it impinges upon a surface 12a of the valve body 12. This creates additional backpressure which reduces the velocity of the flow of water advancing through the recombining chamber 78. The surface 12a redirects the flow of water inwardly towards the fluid passage 26. As the flow of water approaches the fluid passage 26, it collides with flows of water from other directions which are also approaching the fluid passage 26. This again creates additional backpressure which further reduces the velocity of the water entering the fluid passage 26 for advancement to the main chamber 28 (see FIG. 1).

It should be noted that the retainer 20, the flow control member 22, and the suppresser 24, function to impede the flow of water F by creating a serpentine path through which the flow of water F is advanced. Moreover, the retainer 20, the flow control member 22, and the suppresser 24 are configured to create a reverse flow of water RF which opposes the flow of water F thereby creating backpressure and reducing the pressure drop across the flow control member 22 which in turn reduces the velocity of the flow of water advancing through the central passage 23 of the flow control member 22. Moreover, the retainer 20 is configured so as not to reduce the flow rate of the flow of water F advancing through the appliance water valve 10.

Figure 9:
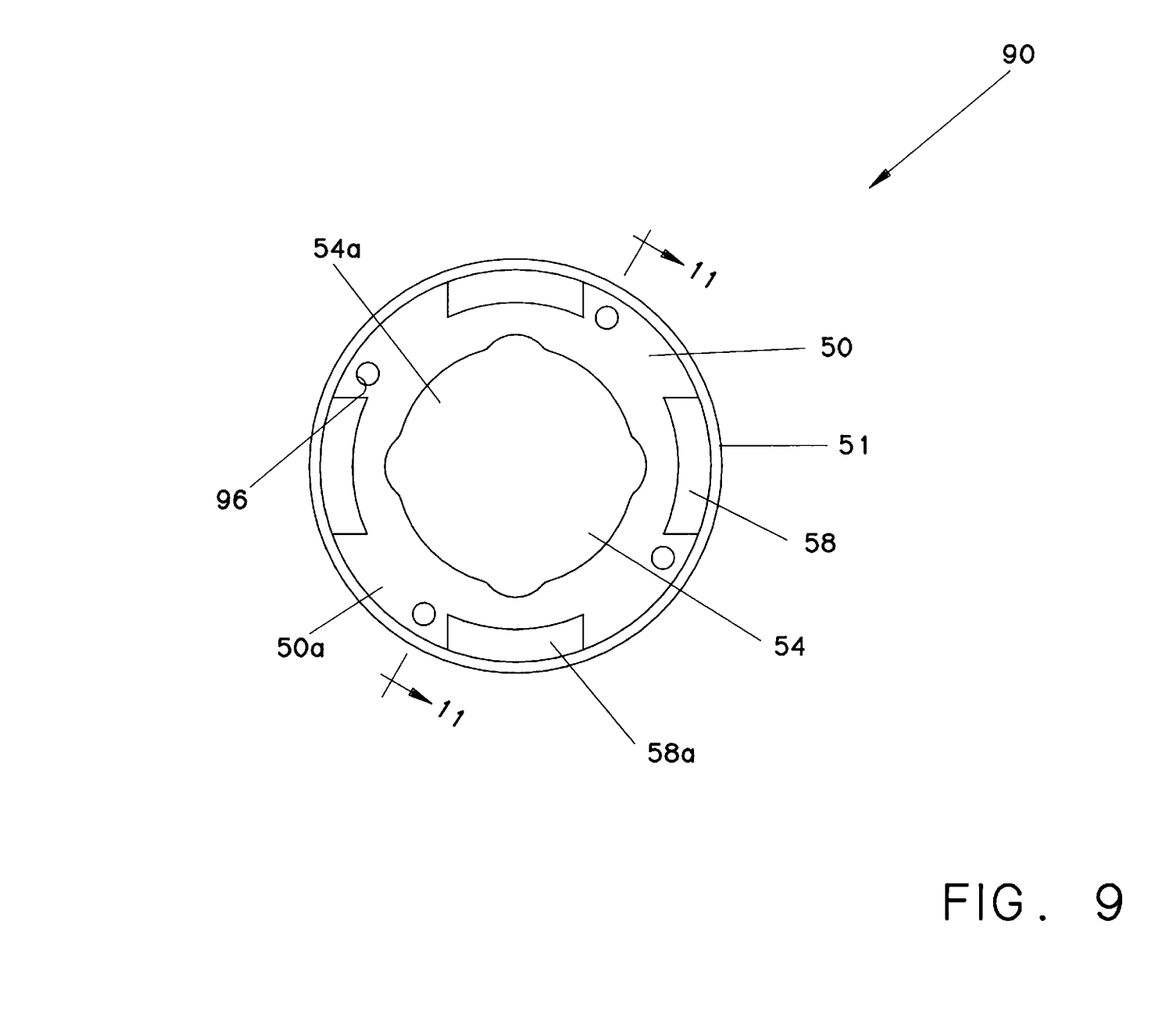
FIG. 9 is a top elevational view of a second embodiment of a retainer which is used in the noise suppression assembly of FIG. 2.
Figure 10:
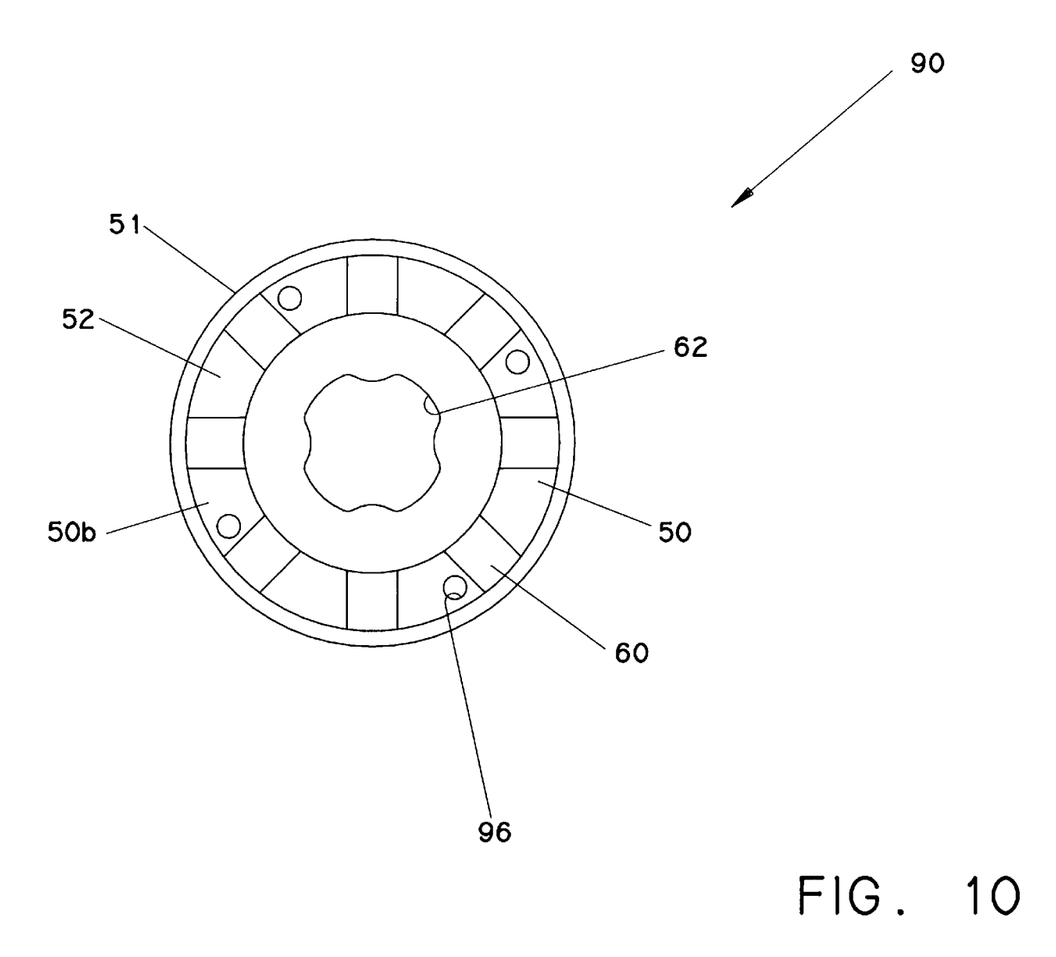
FIG. 10 is a bottom elevational view of the retainer of FIG. 9.
Figure 11:
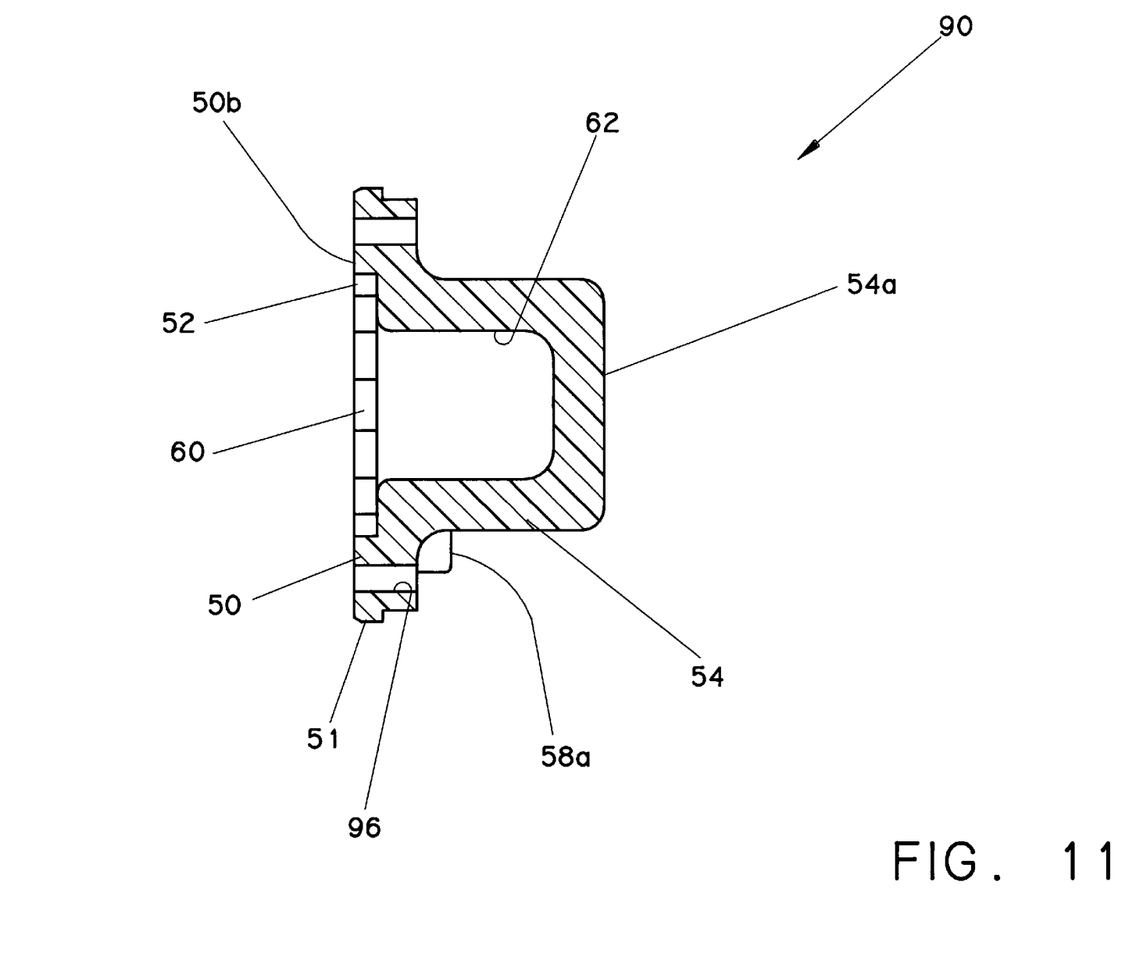
FIG. 11 is a cross sectional view taken along the line 11—11 of FIG. 9 as viewed in the direction of the arrows.

Referring now to FIGS. 9–11, a second embodiment of a retainer 90 is shown. The retainer 90 may be substituted for the retainer 20 for use in the noise suppression assembly 19 of FIG. 2.

In FIGS. 9–11, the same reference numerals are used to designate the same components shown in FIGS. 3–5 which were discussed above. The retainer 90 is essentially the same as the retainer 20, except that the fluid channels 56 have been eliminated on the upstream surface 54a of the body 54. In particular, the upstream surface 54a of the body 54 does not posses any holes therein thereby creating a solid surface. However, a plurality of fluid channels 96 are defined in the base flange 50, as shown in FIGS. 9–11.

While the invention has been illustrated and described in detail in the drawings and foregoing description, such an illustration and description is to be considered as exemplary and not restrictive in character, it being understood that only the preferred embodiments have been shown and described and that all changes and modifications that come within the spirit of the invention are desired to be protected.

What is claimed is:

1. A noise suppression assembly, comprising:
   a retainer having a retainer body defining a central cavity therein, a base flange extending outwardly from said retainer body, and a fluid channel defined therein;
   a flow control member having a central passage through which said flow of water advances, said central passage of said flow control member being offset from said fluid channel of said retainer; and
   a suppresser having a suppresser body, a bullet secured to said suppresser body, and a hole defined therein through which said flow of water advances, said hole of said suppresser being offset from said central passage of said flow control member, and further said bullet being aligned with said central passage of said flow control member.

2. The assembly of claim 1 wherein said fluid channel of said retainer is defined within said retainer body.

3. The assembly of claim 1, wherein said fluid channel of said retainer is defined within said base flange.

4. The assembly of claim 3, wherein said cavity of said retainer body is located upstream relative to said fluid channel of said retainer.

5. A water valve assembly, comprising:
   a valve body having an interior sidewall;
   a retainer including a base flange having a peripheral edge which contacts said interior sidewall of said valve body, and a fluid channel through which a flow of water advances, said fluid channel being spaced apart from said peripheral edge;
   a flow control member having a central passage through which said flow of water advances, said central passage of said flow control member being offset from said fluid channel of said retainer; and
   a suppresser having a hole defined therein through which said flow of water advances, said hole of said suppresser being offset from said central passage of said flow control member.

6. The assembly of claim 5, wherein said fluid channel possesses a diameter ranging between approximately 0.060 inch to approximately 0.090 inch.

7. The assembly of claim 6, wherein said diameter of said fluid channel is equal to approximately 0.075 inch.

8. The assembly of claim 5, wherein:
   said retainer further includes a retainer body defining a central cavity which is secured to said base flange at an upstream side thereof,
   said fluid channel is defined within said retainer body,
   said suppresser includes a suppresser body and a bullet, said bullet being secured to said suppresser body at an upstream side thereof, and
   said bullet is aligned with said central passage of said flow control member.

9. The assembly of claim 5, wherein:
   a plurality of fluid channels are defined within said retainer body,
   said flow of water advances through each of said plurality of fluid channels,
   each of said plurality of fluid channels possesses a diameter ranging between approximately 0.060 inch to approximately 0.090 inch, and each of said plurality of fluid channels is spaced apart from said peripheral edge.

10. A noise suppression assembly for a water valve, comprising:

a retainer having a fluid channel through which a flow of water (F) advances, said retainer being of a construction sufficient to create a reverse flow of water (RF) which opposes said flow of water (F) prior to said flow of water (F) entering said fluid channel thereby reducing the velocity of said flow of water (F);

a flow control member having a central passage through which said flow of water (F) advances, said central passage of said flow control member being offset from said fluid channel of said retainer; and a suppresser having a hole defined therein through which said flow of water (F) advances, said hole of said suppresser being offset from said central passage of said flow control member.

11. The assembly of claim 10, wherein:

said retainer includes a base flange against which said flow of water (F) impinges so as to create said reverse flow of water (RF), and said fluid channel of said retainer includes an inlet which is positioned upstream relative to said base flange.

12. The assembly of claim 11, wherein:

said retainer further includes a body defining a central cavity which is secured to said base flange at an upstream side thereof, and said fluid channel is defined within said body of said retainer.

13. The assembly of claim 10, wherein:

said suppresser includes a suppresser body and a bullet, said bullet being secured to said suppresser body at an upstream side thereof, and said bullet is aligned with said central passage of said flow control member.

14. The assembly of claim 10, wherein:

said suppresser further includes a peripheral wall, and said peripheral wall, said suppresser body, and said bullet define a dispersion chamber through which said flow of water (F) advances.

15. The assembly of claim 10, further comprising a screen which is positioned in contact with said retainer, said screen being located upstream relative to said retainer.

16. A water valve assembly having an inlet and an outlet, with said water valve assembly selectively enabling a flow of water (F) to advance from said inlet to said outlet, comprising:

a noise suppression assembly positioned in said flow of water (F); and a valve mechanism positioned in said flow of water (F), said valve mechanism allows said flow of water (F) to pass from said inlet to said outlet in a first mode of operation, and prevents said flow of water (F) from passing from said inlet to said outlet in a second mode of operation, wherein said noise suppression assembly includes a retainer having a fluid channel through which a flow of water (F) advances, said retainer being of a construction sufficient to create a reverse flow of water (RF) which opposes said flow of water (F) prior to said flow of water (F) entering said fluid channel thereby reducing the velocity of said flow of water (F), a flow control member having a central passage through which said flow of water (F) advances, said central passage of said flow control member being offset from said fluid channel of said retainer, and a suppresser having a hole defined therein through which said flow of water (F) advances, said hole of said suppresser being offset from said central passage of said flow control member.

17. The assembly of claim 16, wherein:

said retainer includes a base flange against which said flow of water (F) impinges so as to create said reverse flow of water (RF), and said fluid channel of said retainer includes an inlet which is positioned upstream relative to said base flange.

18. The assembly of claim 17, wherein:

said retainer further includes a body defining a central cavity which is secured to said base flange at an upstream side thereof, and said fluid channel is defined within said body of said retainer.

19. The assembly of claim 16, wherein:

said suppresser includes a suppresser body and a bullet, said bullet being secured to said suppresser body at an upstream side thereof, and said bullet is aligned with said central passage of said flow control member.

20. The assembly of claim 16, wherein:

said suppresser further includes a peripheral wall, and said peripheral wall, said suppresser body, and said bullet define a dispersion chamber through which said flow of water (F) advances.

21. The assembly of claim 16, wherein:

said noise suppression assembly further includes a valve body having a fluid passage defined therein, and said suppresser being positioned in contact with said valve body such that said hole of said suppresser is offset from said fluid passage of said valve body.

22. The assembly of claim 21, wherein said hole of said suppresser is located upstream relative to said fluid passage of said valve body.

23. The assembly of claim 16, wherein said noise suppression assembly is located upstream relative to said valve mechanism.

24. The assembly of claim 16, wherein said noise suppression assembly further includes a screen which is positioned in contact with said retainer, said screen being located upstream relative to said retainer.

* * * * *